| United States Patent [19] | [11] | 4,199,488 |
|---|---|---|
| Freeman et al. | [45] | Apr. 22, 1980 |

[54] METAL TREATING

[75] Inventors: Dennis B. Freeman, North Harrow; John L. Prosser, Richmond, both of England

[73] Assignee: Oxy Metal Industries Corporation, Warren, Mich.

[21] Appl. No.: 901,679

[22] Filed: May 1, 1978

[30] Foreign Application Priority Data

May 3, 1977 [GB] United Kingdom ............... 18403/77

[51] Int. Cl.² .............................................. C08L 33/04
[52] U.S. Cl. ........................... 260/29.6 MP; 148/6.2; 427/435; 260/29.6 MN
[58] Field of Search ................... 260/29.6 N, 29.6 MP, 260/29.6 MN, 29.7 P, 29.7 N; 148/6.2; 427/435

[56] References Cited

U.S. PATENT DOCUMENTS

| 3,935,150 | 1/1976 | Oxe .............................. 260/29.6 MN |
| 4,030,945 | 6/1977 | Hall ........................................ 148/6.2 |

*Primary Examiner*—Paul R. Michl
*Attorney, Agent, or Firm*—Arthur E. Kluegel; Richard P. Mueller

[57] ABSTRACT

An auto-phoretic aqueous acidic coating composition is free of fluoride and hydrogen peroxide and contains an organic film forming resin, phosphate and a nitrobenzoic acid or derivative thereof. The composition imparts corrosion resistance when contacted with a metal surface.

6 Claims, No Drawings

METAL TREATING

BACKGROUND OF THE INVENTION

In recent years several processes for coating metal surfaces have been described which comprise contacting the metal surface with an acidic aqueous resin dispersion which is such that the acid etches the metal surface to generate metal ions and as a result the dispersion becomes destabilised adjacent the metal surface to deposit thereover a substantially uniform coating comprising the resin, and probably also the metal ions. The process has the particular advantage that it will give substantially uniform thickness irrespective of the shape of the article, whereas conventional techniques of applying a coating, such as brushing, give variable thickness. Many of these so-called "auto-phoresis" processes are listed in, for example, British Patent specification No. 1,431,843.

In practice the process generally requires the presence both of an acid and an oxidizing agent and most of the processes that have been described use hydrofluoric acid as the acid and hydrogen peroxide as the oxidizing agent. It has of course long been recognized that in theory it might be possible to use other acids and other oxidizing agents. Thus in British Pat. specification No. 1,349,827 it is proposed to use, for example, sulphuric acid, hydrochloric acid, hydrofluoric acid, nitric acid, acetic acid and various others, but hydrofluoric acid is said to be preferred and is used in the Examples. Similarly again in the British Patent specification No. 1,349,827, various oxidizing agents are proposed for example, perborate, bromate, permanganate, nitrite, nitrate and chlorate but again hydrogen peroxide is preferred and is used in the Examples. In British Patent specification No. 1,241,991, phosphoric acid is said to be the preferred acid. A wide range of oxidizing agents are proposed, including benzoquinone, nitrophenol, persulfates and nitrates but again hydrogen peroxide is preferred.

Hydrofluoric acid is an undesirable material to use, especially in the large amounts, (e.g. up to 5% of the treatment solution) generally used in auto-phoresis processes. Hydrogen peroxide is a convenient oxidant in that it does not create any pollution problems but it tends to be unstable and so it is impossible to make up the treatment solution a long time before use. Instead, either it must be made up specially for use and/or peroxide must be added during the process. It has therefore been our object to devise a process that does not require hydrofluoric acid and hydrogen peroxide.

SUMMARY OF THE INVENTION

In the invention a coating is formed on a metal surface by contacting the surface with an aqueous resin dispersion that includes phosphoric acid and a water soluble nitrobenzoic acid or a derivative thereof.

DETAILED DESCRIPTION OF THE INVENTION

Suitable nitrobenzoic acid derivatives are, for instance, the alkali metal, ammonium or amine salts of the acids as well as the esters and other derivatives that can easily be formed from the carboxylic group. The preferred nitrobenzoic acid for use in the invention is m-nitrobenzoic acid, in the free acid form.

The amount of nitrobenzoic acid is preferably 0.25 to 3 grams per liter with best results generally being obtained at about 1.5 grams per liter.

The amount of phosphoric acid is preferably from 0.01 to 0.2 N with best results being obtained at about 0.02 to 0.05 N. Thus preferably 0.3 to 3 grams per liter phosphoric acid is used generally about 1 gram per liter.

Any of the aqueous resin dispersions employable in an auto-phoresis process, such as discussed in British Patent specification No. 1,431,843, may be used. The amount of resin is preferably from 20 to 200 grams per liter with best results generally being obtained at from 40 to 120 grams per liter. The aqueous resin dispersion will contain dispersing agents in conventional manner which are generally nonionic. The resin should be a film forming resin. Preferably it is an acrylic resin.

The coating solution preferably consists solely of the resin dispersion including dispersing agents, the phosphoric acid and the nitrobenzoic acid derivative and water and in particular, should be free of hydrogen peroxide and hydrofluoric acid.

The metal surface to be treated may be any surface etchable by the solution, but in practice it will be a ferrous surface, generally iron or steel. The surface may carry a conversion coating on it, such as is described in British Patent specification No. 1,431,843, but preferably is a bare metal surface which preferably will have been cleaned first.

Contact between the aqueous acidic resin dispersion and the surface is best achieved by immersion. Immersion is continued for the time recessary to achieve a coating of the desired thickness. Generally, immersion is from 15 seconds to 2 minutes. The article may then be rinsed, for example with cold water, and then given conventional post-treatments. At some stage it is baked, generally after the first rinsing step.

The resultant coating may provide an adequate treatment for some surfaces, for example surfaces of engine parts, but generally one or more applications of other resin coatings, for example conventional siccative paints will be applied subsequently such as for car body components.

In an Example, a composition was made by mixing 50 grams of an acrylic resin dispersion sold under the Tradename "Primal" AC 64 ("Primal" being a Trademark), 7.5 mls of 10% phosphoric acid solution, 1.5 grams m-nitrobenzoic acid and sufficient water to make a liter. A clean steel panel was immersed in this solution for 5 minutes and was then removed, allowed to drain for 90 seconds and baked at 140° C. for 10 minutes. This steel panel was the subjected to a 24 hour salt spray test in accordance with ASTM-B114. 5% rusting was observed.

In a comparative Example the nitrobenzoic acid was omitted and 2.5 grams of 30% hydrogen peroxide was added in its place. When subjected to the same salt spray test this gave 100% rusting.

In another comparative Example 25 mls of 4% hydrogen fluoride solution was used in place of the phosphoric acid and 2.5 grams of 30% hydrogen peroxide solution was used in place of the nitrobenzoic acid, and when subjected to the same salt spray test 10% rusting was observed.

These results show that, in addition to avoiding the known undesirable consequences of hydrofluoric acid and hydrogen peroxide the invention can give results better than those in accordance with conventional auto-phoresis processes using HF and hydrogen peroxide and give a remarkable improvement over the results obtainable when phosphoric acid is used with hydrogen peroxide.

The invention includes not only the process described, but also the working solutions used in the process and concentrates useful for making them.

What is claimed is:

1. An aqueous acidic composition free of fluoride and hydrogen peroxide comprising a film-forming organic resin, phosphoric acid and a water soluble nitrobenzoic acid or derivative thereof selected from the group consisting of the alkali metal, ammonium and amine salts and esters.

2. The composition of claim 1, wherein the resin content is from 20 to 200 g/l.

3. The composition of claim 1 or 2, wherein the phosphoric acid content is from 0.3 to 3 g/l.

4. The composition of claim 1 or 2, wherein the concentration of the nitrobenzoic acid or derivative thereof is from 0.25 to 3 g/l.

5. The composition of claim 1 or 2, comprising m-nitrobenzoic acid.

6. A process for imparting corrosion resistance to a metal surface comprising contacting the surface with the composition of claim 1.